United States Patent [19]

Prejean

[11] Patent Number: 5,137,974

[45] Date of Patent: Aug. 11, 1992

[54] HOT MELT ADHESIVE COMPOSITIONS

[75] Inventor: George W. Prejean, Orange, Tex.

[73] Assignee: E. I. du Pont de Nemours and Company, Wilmington, Del.

[21] Appl. No.: 514,786

[22] Filed: Apr. 25, 1990

[51] Int. Cl.$^5$ ............................................. C08L 77/00
[52] U.S. Cl. ..................................... 525/183; 525/178
[58] Field of Search ........................................ 525/183

[56] References Cited

U.S. PATENT DOCUMENTS

| | | |
|---|---|---|
| Re. 30,322 | 7/1980 | Hammer et al. ............ 525/183 |
| Re. 30,754 | 9/1981 | Hammer et al. ............ 525/379 |
| 3,963,799 | 6/1976 | Starkweather, Jr. ......... 525/66 |
| 3,976,720 | 8/1976 | Hammer et al. ............ 525/66 |
| 4,225,476 | 9/1980 | Hammer et al. ............ 525/182 |

*Primary Examiner*—Ana L. Carrillo
*Attorney, Agent, or Firm*—Craig H. Evans

[57] ABSTRACT

Hot melt adhesive composition of ethylene copolymer grafted with lactam oligomer, characterized by improved melt flow characteristics.

5 Claims, No Drawings

HOT MELT ADHESIVE COMPOSITIONS

BACKGROUND OF THE INVENTION

Hot melt thermoplastic adhesives are widely used in the packaging, automotive, furniture, and shoe industries. A wide variety of adhesive formulations has previously been suggested to provide the required balance of adhesive and cohesive strengths, workability, and resistence to moisture, solvents, and temperature extremes.

Hammer, in U.S. Pat. No. Re. 30,754, discloses graft copolymers based on ethylene polymers with grafted lactam moieties. While these compositions exhibit a variety of desirable properties, they generally do not have melt flow characteristics which permit their effective use as hot melt adhesives.

SUMMARY OF THE INVENTION

The present invention provides a grafted ethylene copolymer which exhibits an outstanding combination of melt flow and performance characteristics which permits their use as hot melt adhesives for a variety of demanding environments.

Specifically, the instant invention provides a copolymer of complemental quantities of ethylene, about from 20 to 50 weight % acrylate, and about from 0.05 to 0.125 moles, per 100 grams of copolymer, of monomer which provides amine reactive sites, the ungrafted copolymer having a molecular weight which provides a Melt Index of the copolymer of at least about 500; the copolymer having grafted thereto about from 15 to 45 weight %, by weight of the total polymer, of monoamine-terminated lactam oligomer having a molecular weight of about from 1000 to 3000, and wherein the quantities of amine reactive sites and the lactam oligomer are such as to provide at least about 0.02 moles of unreacted amine reactive sites per 100 grams of copolymer.

DETAILED DESCRIPTION OF THE INVENTION

The copolymers of the present invention can be prepared using the basic components and copolymerization and grafting techniques shown in Hammer, U.S. Pat. No. Re. 30,754, hereby incorporated by reference.

The basic copolymer is prepared from ethylene and about from 20 to 50 weight % acrylate. A variety of acrylates can be used in the preparation of these compounds. However, alkyl acrylates are preferred, and n-butyl acrylate has been found to give particularly good performance characteristics.

The copolymer further comprises about from 0.05 to 0.125 moles, per 100 grams of copolymer, of monomer which provides amine reactive sites, as described in the Hammer patent. One particularly satisfactory monomer is maleic anhydride monoethyl ester (MAME). Other monomers which can be used in the present invention include monoethyl fumarate, other monoesters of maleic and fumaric acid, maleic anhydride, and monomers with vicinal carboxylic groups.

The copolymers are grafted with about from 15 to 45 weight %, by weight of the total polymer, of monoamine-terminated lactam oligomer having a molecular weight of about from 1000 to 3000. In general, polycaprolactam oligomer is preferred. The present invention is based, in part, on the discovery that a minimum excess of unreacted amine reactive sites, after grafting of the lactam oligomer, results in markedly increased melt flow for the copolymer. As with many grafted copolymers of this type, the basic ethylene copolymer forms a phase that is separate from the grafted component. In the present compositions, it has been found that, with quantities of the lactam as low as 15 weight percent, the lactam forms the continuous phase of the copolymer. This is particularly desirable in the improvement of high temperature resistance of the final copolymer, either alone or formulated as an adhesive.

The present copolymers, when used as hot melt adhesives, are generally formulated with one or more plasticizers, tackifiers and fillers for optimum performance characteristics. A wide variety of plasticizers can be used to advantage, including both reactive and nonreactive plasticizers. For example, a combination of two nonreactive plasticizers which has been found particularly satisfactory is octyl benzyl phthalate and dodecyl diphenyl phosphate. Similarly, a combination of reactive and nonreactive plasticizers which has been found particularly satisfactory is amine terminated propylene oxide/ethylene oxide copolymer and octyl benzyl phthalate. In this case, the phthalate plasticizer, at a concentration of about from 5 to 15%, and especially about 10%, appears to plasticize only the ethylene copolymer phase, and thereby not depreciate high temperature performance. The phosphate plasticizer is compatible with both phases, and can be used at low concentrations, of about from 0.5 to 3%, and especially about 1%, thereby similarly preventing adverse effects on the excellent high temperature properties of the present compositions.

The present copolymers provide outstanding performance as hot melt adhesives. The high melt flow characteristics are desirable in the application of the materials to a substrate, and provide good adhesive and cohesive strengths. In addition, the copolymers have an unusual combination of heat and moisture resistance. The high heat resistance may be due to the lactam content, and the presence of this component as the continuous phase. However, lactams do not generally exhibit the low moisture sensitivity of the present adhesives. This combination of desirable performance characteristics is obtained without sacrifice of the excellent low temperature properties which is characteristic of ethylene-acrylate copolymers.

The present invention is further illustrated by the following specific examples and comparative examples, in which parts and percentages are by weight unless otherwise indicated.

COMPARATIVE EXAMPLE A 150 grams of a 500 melt index ethylene terpolymer containing 64 wt % ethylene, 30 wt % n-butyl acrylate (nBA) and 6 wt % maleic anhydride monoethyl ester (MAME) and 2.5 gram of a phenolic antioxidant (Irganox ® 1098 from Ciba Geigy) were added to a Haake batch mixer (operated at 50 rpm) at 175° C. and mixed for 3-5 minutes. 100 grams of a 205° C. melting point nylon-6 oligomer, having only one primary amine end per oligomer molecule, with a number average molecular weight of 1600, was then added to the mixer. The final composition was as follows:
59.4 wt % ethylene terpolymer
39.6 wt % of grafted nylon-6 oligomer
1.0 wt % phenolic antioxidant The temperature was raised to 240° C. (above the oligomer melting point) for 15 minutes to allow completion of the grafting reaction. Some foaming occurred during the first 5 minutes as reaction products (water and ethanol) were formed and volatilized. The temperature in the mixer was then reduced to 50° C. and the resulting nylon grafted terpolymer was removed.

The resulting grafted terpolymer was evaluated, and the properties are summarized in Table I. Melt flow at 220° C. was only 0.03. There was a stoichiometric balance between the MAME graft sites and the amine ended oligomer. Consequently no excess MAME was present in the ethylene terpolymer.

EXAMPLE 1

150 grams of a 500 melt index ethylene terpolymer containing 30 wt % nBA and 10 wt % MAME was reacted with 100 grams of a 205° C. melting point nylon-6 oligomer (only one primary amine end per oligomer molecule) with a number average molecular weight of 1600 using the method described in Comparative Example A. 2.5 gram of phenolic antioxidant were added as in Example A. The final composition was the same as shown in Example A, except that approximately 4 wt % (0.0277 moles) of unreacted MAME remained in the ethylene terpolymer backbone (based on the weight of ethylene terpolymer only) after completion of the grafting reaction. The properties of the copolymer were tested as before, and are summarized in Table I. Melt flow at 220° C. was 3.5, markedly higher than Comparative Example A.

EXAMPLE 2

The general procedure of Example 1 was repeated, except that 14 wt % MAME was used. The final composition was the same as in Example A, except that approximately 8 wt % (0.0555 moles) of unreacted MAME remained in the ethylene terpolymer backbone after completion of the grafting reaction.

The properties of the copolymer were tested as before, and are summarized in Table I. Melt flow at 220° C. was 27. Performance in the 100° C. lap shear test was good, indicating good cohesive strength and substrate wetting. Moisture resistance of bonds produced from this adhesive composition also proved to be very good. Lap shear joints prepared with this adhesive gave equivalent performance before and after being immersed in boiling water for 2 hours.

The data demonstrate that the excess graft sites in the products of Examples 1 and 2 provide an unexpected improvement on melt flow and viscosity over the composition of Comparative Example A.

COMPARATIVE EXAMPLE B

Lap shear joints (bond thickness=20 mils) were prepared in a heated press from Macromelt 6245 (a dimer acid based polyamide hot melt adhesive sold by Henkel Corp). Stainless steel coupons (3"×1"×0.03") were utilized. Lap joints (one square in overlap) before and after immersion in boiling water for 2 hours were pulled at 100° C. (rate was 1"/min). The lap shear values for the joints before and after immersion in boiling water were 160 psi and 10 psi, respectively.

EXAMPLE 3

A plasticized composition was prepared by formulating 224.2 grams of material from Example 2 with 25 grams of an alkyl benzyl phthalate (Santicizer 261 from Monsanto) and 2.5 grams of isodecyl diphenyl phosphate (Santicizer 148 from Monsanto) by blending in a Haake mixer (operated at 50 rpm) at 240° C. for 10 minutes. The final composition was as follows:

52.9 wt % ethylene terpolymer
35.3 wt % nylon-6 oligomer
9.93 wt % Santicizer 261
0.99 wt % Santicizer 148
0.90 wt % phenolic antioxidant The composition was evaluated as before, and the results are summarized in Table I. Compared with the unformulated grafted terpolymer adhesive produced in Example 2, viscosity was significantly reduced and low temperature toughness improved (as indicated by a lowering of the glass transition temperature) without a significant reduction in cohesive strength (as measured by 100° C. lap shear) even though tensile strength was lower. Heat resistance was only slightly reduced as indicated by the Thermal Mechanical Analysis (TMA) temperature. TMA is a probe penetration test in which the sample is heated at a constant rate and the temperature at which penetration starts (softening temperature) is reported as the TMA temperature. TMA temperature correlates with the heat resistance of an actual adhesive bond. The results of this test demonstrate that this combination of plasticizers substantially plasticizes only the ethylene terpolymer phase. The good 100° C. lap shear performance also shows that the plasticizers remained soluble in the ethylene terpolymer phase at 100° C., and did not diffuse to the interface and create a weak boundary layer which would have destroyed the adhesion.

In Examples 4 and 5 and Comparative Example C, the TMA probe penetration test was used to determine which phase (nylon or ethylene terpolymer) is continuous. Probe penetration starts near the melting point of the phase that is continuous (approximately 200° C. for nylon and 60° C. for ethylene terpolymer).

EXAMPLE 4

An adhesive composition was prepared from 166.43 grams of a 1500 melt index ethylene terpolymer containing 30 wt % nBA and 15.5 wt % MAME, 29.37 grams of a nylon-6 oligomer with a 205° C. melting point (only one amine end per molecule) with a number average molecular weight of 1500, 22 grams of Santicizer 261, 2.2 grams of Santicizer 148 and 3 grams of Irganox ® 1098 in a Haake mixer utilizing the method described in Example A. The final composition is as follows:

74.6 wt % ethylene terpolymer
13.17 wt % nylon-6 oligomer
9.89 wt % Santicizer 261
0.99 wt % Santicizer 148
1.35 wt % Irganox ® 1098

The composition was evaluated as before, and the results are summarized in Table I. The TMA softening temperature indicates that nylon is the continuous phase even at this low graft level. Performance in 100° C. lap shear test was good considering the low tensile strength.

COMPARATIVE EXAMPLE C

An adhesive composition similar to that of Example 4 was prepared in a Haake mixer using the general method described in Example A, and using an ethylene copolymer having a melt index of 600 instead of 1500.

The composition was evaluated as before, and the results are summarized in Table I. The TMA softening point shows that in this case the ethylene terpolymer and not nylon is the continuous phase. Surprisingly, changing from a 1500 melt index to a 600 melt index base ethylene terpolymer caused a phase inversion. Performance in the 100° C. lap shear test was poor, showing poor heat resistance.

EXAMPLE 5

An adhesive composition was prepared from 156.64 grams of an ethylene terpolymer containing 30 wt % nBA and 15.5 wt % MAME, 39.16 grams of a nylon-6 oligomer (only one amine end per molecule) with a melting point of 205° C. and a number average molecular weight of 1500, 22 grams of Santicizer 261, 2.2 grams of Santicizer 148 and 3 grams of Irganox ® 1098. The final composition was a follows:
70.24 wt % ethylene terpolymer
17.56 wt % nylon-6 oligomer
9.89 wt % Santicizer 261
0.99 wt % Santicizer 148
1.35 wt % Irganox ® 1098

The composition was evaluated as before, and the results are summarized in Table I. The TMA softening point shows that the 20 wt % graft level nylon is the continuous phase, even when the ethylene terpolymer MI is 600.

EXAMPLE 6

In Example 6, the general procedure of Example 2 was repeated, preparing an adhesive with the same graft level and residual MAME concentration. However, the ethylene terpolymer melt index was 1500 instead of 500. The viscosity was significantly reduced by using the lower molecular weight ethylene terpolymer with some sacrifice in tensile properties and 100° C. lap shear performance. Heat resistance as indicated by the TMA temperature was not reduced.

The resulting properties are summarized in Table I.

EXAMPLE 7

In Example 7, the general procedure of Example 2 was repeated, except the molecular weight of the nylon-6 oligomer was 2300 instead of 1600, and the unreacted MAME was 9.82 wt % (0.1023 moles), and provided a lower viscosity.

The composition was evaluated as before, and the results are summarized in Table I.

TABLE I

PROPERTIES OF GRAFTED TERPOLYMER ADHESIVES

| EXAMPLE | TENSILES UT (psi) | Y (psi) | % E | Tg (°C.) ETHYLENE TERPOLYMER PHASE | TMA (°C.) | MP (°C.) (NYLON PHASE) | FP (°C.) (NYLON PHASE) | 220° C. VISCOSITY (CENTI-POISE) | 220° C. MELT FLOW (GMS/10 MINUTES) | 100° C. LAP SHEAR[2] (psi, 1"/MIN) |
|---|---|---|---|---|---|---|---|---|---|---|
| A | 2602 | 2602 | 276 | −29 | 190 | 203 | 150 | — | .03 | 180 |
| 1 | 2821 | 2821 | 254 | −23 | 196 | 205 | 152 | — | 3.5 | 325 |
| 2 | 2816 | 2153 | 188 | −18 | 197 | 209 | 165 | 270M | 27 | 375 |
| 3 | 1580 | 1006 | 133 | −38 | 197 | 209 | 165 | 27M | 118 | 360 |
| 4 | 165 | 147 | 35 | −38 | 182 | 192 | 105 | 5M | 1 | 160 |
| C | — | — | — | −38 | 63 | — | — | — | 1 | 60 |
| 5 | — | — | — | −38 | 183 | 197 | 120 | 15M | 575 | 210 |
| 6 | 1743 | 1445 | 171 | −18 | 195 | 198 | 160 | 55M | 164 | 370 |
| 7 | — | — | — | −18 | 195 | 215 | 165 | 130M | 63 | 300 |

[1]Too high to measure.
[2]Stainless steel lap shear coupons were used. Bond thickness was 20 mils.

I claim:

1. A copolymer of complemental quantities of ethylene, about from 20 to 50 weight % acrylate, and about from 0.05 to 0.125 moles, per 100 grams of copolymer, of monomer which provides amine reactive sites, the ungrafted copolymer having a molecular weight which provides a Melt Index of the copolymer of at least about 500; the copolymer having grafted thereto about from 15 to 45 weight %, by weight of the total polymer, of monoamine-terminated lactam oligomer having a molecular weight of about from 1000 to 3000, and wherein the quantities of amine reactive sites and the lactam oligomer are such as to provide at least about 0.02 moles of unreacted amine reactive sites per 100 grams of copolymer and wherein the lactam oligomer is the continuous phase of the copolymer.

2. A copolymer of claim 1 wherein the acrylate is an alkyl acrylate.

3. A copolymer of claim 2 wherein the acrylate consists essentially of butyl acrylate.

4. A copolymer of claim 2 wherein the acrylate comprises about from 25 to 35 weight % of the copolymer.

5. A copolymer of claim 1 wherein the amine reactive sites are derived from maleic anhydride monoethyl ester.

* * * * *